US012338359B2

(12) United States Patent
Cafmeyer et al.

(10) Patent No.: US 12,338,359 B2
(45) Date of Patent: *Jun. 24, 2025

(54) SOYBEAN-BASED POWDER COATING RESINS FROM C16-C23 DIESTERS

(71) Applicant: Battelle Memorial Institute, Columbus, OH (US)

(72) Inventors: Jeffrey T. Cafmeyer, Columbus, OH (US); Daniel B. Garbark, Blacklick, OH (US)

(73) Assignee: Battelle Memorial Institute, Columbus, OH (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/965,004

(22) PCT Filed: Jan. 25, 2019

(86) PCT No.: PCT/US2019/015236
§ 371 (c)(1),
(2) Date: Jul. 26, 2020

(87) PCT Pub. No.: WO2019/147995
PCT Pub. Date: Aug. 1, 2019

(65) Prior Publication Data
US 2021/0054227 A1 Feb. 25, 2021

Related U.S. Application Data

(60) Provisional application No. 62/622,180, filed on Jan. 26, 2018.

(51) Int. Cl.
C09D 167/02 (2006.01)
C08G 63/685 (2006.01)
C09D 5/03 (2006.01)

(52) U.S. Cl.
CPC ....... *C09D 167/02* (2013.01); *C08G 63/6856* (2013.01); *C09D 5/03* (2013.01)

(58) Field of Classification Search
CPC ............ C08G 63/6854; C08G 63/6856; C09D 167/00; C09D 167/02; C09D 5/03
See application file for complete search history.

(56) References Cited

U.S. PATENT DOCUMENTS

| 3,331,886 | A | | 7/1967 | Zimmerman et al. |
| 3,772,231 | A | | 11/1973 | Enomoto et al. |
| 4,048,252 | A | | 9/1977 | Behmel |
| 4,248,978 | A | | 2/1981 | de Cleur et al. |
| 5,034,297 | A | | 7/1991 | Yoerger |
| 5,439,988 | A | * | 8/1995 | Moens ................. C08G 63/199 528/307 |
| 2005/0277745 | A1 | | 12/2005 | Walrath et al. |
| 2009/0264672 | A1 | * | 10/2009 | Abraham ............. B01J 31/2278 562/595 |
| 2010/0028582 | A1 | | 2/2010 | Joch et al. |
| 2010/0113689 | A1 | | 5/2010 | Naiki et al. |
| 2011/0244157 | A1 | | 10/2011 | Singer et al. |
| 2013/0209812 | A1 | | 8/2013 | Gorodisher et al. |
| 2014/0364581 | A1 | * | 12/2014 | Hunt .................. C08G 63/6858 528/291 |
| 2016/0009953 | A1 | | 1/2016 | Erdodi et al. |
| 2016/0060480 | A1 | * | 3/2016 | Mody ................. C08G 63/199 524/604 |
| 2016/0222221 | A1 | | 8/2016 | Saito et al. |
| 2017/0233605 | A1 | | 8/2017 | Erdodi et al. |

FOREIGN PATENT DOCUMENTS

| EP | 0002464 A1 | 6/1979 |
| GB | 994717 | 1/1963 |
| GB | 1043098 | 11/1964 |
| GB | 2231334 A | 11/1990 |
| WO | 9821264 A1 | 5/1998 |
| WO | 9916810 | 4/1999 |
| WO | 0056804 | 9/2000 |
| WO | 2014193713 A1 | 12/2014 |
| WO | 2018022810 A1 | 2/2018 |

OTHER PUBLICATIONS

Florian Stempfle et al "Long-Chain Aliphatic Polymers to Bridge the Gap between Semicrystalline Polyolefins and Traditional Polycondensates", Chem. Rev. 2016, 116, 4597-4641 (Year: 2016).*
Murase et al "Poly(Ester Amide)s: Recent Developments on Synthesis and Applications", Natural and Synthetic Biomedical Polymers, 2014, pp. 145-166 (Year: 2014).*
Allyson Beuhler "C18 Diacid Market to Grow and Expand Into an array of novel products with superior properties", Elevance, Sep. 16, 2013. (Year: 2013).*
Borriello et al"Poly(amide-ester)s Derived from Dicarboxylic Acid and Aminoalcohol", Journal of Applied Polymer Science, vol. 95, 362-368 (2005) (Year: 2005).*
Clément Girard et al "Synthesis and characterization of poly(ester amide amide)s of different alkylene chain lengths" Polym. Bull. (2019) 76:495-509 (Year: 2018).*
Key Kobayashi et al "Studies on the synthetic fibre of the polyester amide", 1958. (Year: 1958).*
Patil et al "Synthesis of bio-based polyurethane coatings from vegetable oil and dicarboxylic acids", Progress in Organic Coatings 106 (2017) 87-95 (Year: 2017).*
Beuhle "C18 Diacid Market to Grow and Expand Into an Array of Novel Products with Superior Properties", 2016 (Year: 2016).*

(Continued)

*Primary Examiner* — Frances Tischler
*Assistant Examiner* — Gennadiy Mesh
(74) *Attorney, Agent, or Firm* — Greer, Burns & Crain, Ltd.

(57) ABSTRACT

Powder coating resins and coatings made using the powder coating resins are described. The powder coating resins are based on the use of $C_{12}$ to $C_{23}$ diesters. The $C_{12}$ to $C_{23}$ diesters are reacted with a reactant having an alcohol functionality and an amine functionality to form an intermediate polyol, followed by reaction with a diacid to a carboxylic acid terminated polymer having ester and amide functionality.

6 Claims, No Drawings

(56) References Cited

OTHER PUBLICATIONS

International Preliminary Report on Patentability from corresponding PCT application No. PCT/US2019/015236 issued on Jul. 28, 2020.
International Preliminary Report on Patentability from corresponding PCT application No. PCT/US2019/015234 issued on Jul. 28, 2020.
International Search Report from PCT/US2019/015236, mailed Apr. 12, 2019.
Written Opinion from PCT/US2019/015236, mailed Apr. 12, 2019.
International Search Report from PCT/US2019/015234, mailed Apr. 12, 2019.
Written Opinion from PCT/US2019/015234, mailed Apr. 12, 2019.
Sharma, Bhaskar, Synthesis and Characterization of Alternating Poly(amide urethane)s.

* cited by examiner

SOYBEAN-BASED POWDER COATING RESINS FROM C16-C23 DIESTERS

CROSS-REFERENCE TO RELATED APPLICATIONS

This application is a U.S. National Phase under 35 U.S.C. § 371 of International Application No. PCT/US2019/015236, filed Jan. 25, 2019 which claims the benefit of U.S. Patent Application No. 62/622,180, entitled Soybean Based Powder Coating Resins from C16-C23 Diesters, filed Jan. 26, 2018 the contents of each of which are incorporated by reference in their entirety.

BACKGROUND

The popularity of powder coatings continues to expand, and these coatings are gradually replacing traditional liquid paints and coatings for appliances, automotive parts and a wide range of consumer goods. This is driven by the attractive combination of solvent-free and high transfer efficiency processes. While the vast majority of powder coatings are applied to metal parts and components, significant growth opportunities exist for coating heat sensitive substrates such as wood, plastics, and composites. Powder coating these materials requires formulations which cure at lower temperatures and yet maintain stable storage and powder transfer characteristics as well as high reactivity. Ultra-low bake formulations have been introduced to address this burgeoning market. These systems are based on traditional petroleum based polyester resins, which are principally responsible for the physical and chemical properties of the powder coating formulation.

Polyesters are the workhorse resin system for thermosetting powder coatings with numerous compositional variations enabling their versatility and use in a wide range of applications. Constructed by the condensation polymerization of alcohols and carboxylic acids from a diverse assortment of aliphatic and aromatic derivatives, polyester resins are designed for both their powder characteristics and their ultimate coating performance. For thermal cured systems, this means that the resin must be able to be converted into a powder via the formulation processes, remain stable under shipping and storage conditions, and be cured at elevated temperature to a final coating with the expected properties. As cure conditions are reduced, primarily temperature but also with respect to time, the thermal characteristics of the resin may need to be adjusted to provide the necessary flow, leveling and film formation when the resin is melted and cure is activated on the substrate. However, the extent of the ability to make these changes is limited and often runs counter to both powder stability as well as coating performance. The standard polyester building blocks (e.g., terephthalic acid, isophthalic acid, adipic acid, sebacic acid, neopentyl glycol, trimethylol propane, etc.) have a long history of use in conventional powder coatings at higher temperatures, but have not been combined in a manner to bring a full solution to this low-temperature cure need. This is due to the limited range of some of the key physical properties of these building blocks, due to their petroleum-based origin.

Therefore, there is a need for improved powder coatings, powder coating resins, and method of making a powder coating.

DESCRIPTION OF THE INVENTION

This application describes the composition of polymer resins from aliphatic $C_{12}$ to $C_{23}$ diesters, to powder coatings made from the polymer resins, and to methods of making the polymer resins. These resins contain amide and ester functionality and reactive carboxylic acid terminal functionality which allow for the curing of the resin with a crosslinking agent to form a thermoset polymer useful for coatings and powder coating applications in particular. With suitable physical characteristics to be pulverized into a free-flowing powder, the resins also exhibit relatively low melting points, low melt viscosity, low solubility in common solvents and reactivity with conventional curing agents which makes them particularly amenable to low-temperature cure powder coatings and specifically for coating of heat-sensitive substrates. In addition, in some cases, the desirable $C_{12}$ to $C_{23}$ diesters used in these resins may be sourced from biobased feedstocks such as fatty acids from soybeans.

Biobased polyester building blocks, such as triglyceride oils and associated fatty acids and ester derivatives, have been adapted and converted for use in coating applications due to their range of physical properties such as flexibility and hydrophobicity.

Research into biobased materials for resin development offers an approach which introduces new building blocks with characteristics and features which can be leveraged to meet the shift in requirements for heat sensitive substrates. In addition, incorporating biobased resins from renewable feedstocks such as soybean oil introduces the aspect of sustainability which has particular appeal in the coating of wood products such as hardwood products or medium-density fiberboard (MDF). MDF is currently one of the largest opportunities for expansion of powder coatings, as it is used in a variety of consumer products including ready-to-assemble furniture, cabinetry, countertops and other building materials, store displays and point-of-purchase (POP) installations, and a broad range of other products for home and office.

The oleochemical industry continues to introduce new products derived from animal fats and vegetable oils that are not easily obtained from petroleum feedstocks. One such emerging product family is aliphatic α,ω-long-chain diacids which are commercially prepared from fatty acids via fermentation or olefin metathesis pathways. The chemical conversion of readily available fatty acids results in a $C_{18}$ diacid building block, octadecanedioic acid, which is similar yet significantly different than the petroleum based $C_6$ adipic acid or even biobased $C_9$ azelaic acid. During the production of these long-chain diacids, an intermediate diester derivative may be produced and be an advantageous feedstock for derivative products from a chemical reactivity as well as a cost and commercial availability standpoint.

Prior experience with long-chain diacids included observations of interesting melting characteristics of long-chain diester and amide derivatives with sharp, relatively high melting points. It was hypothesized that long-chain diacid resin analogs would possess greater solvent resistance, hydrolytic stability, toughness and flexibility relative to the properties of short-chain aliphatic systems, and that these resin analogs could be designed to possess appropriate melt characteristics suitable for a low-temperature powder coating resin. To be an effective improvement over current resins, a target cure temperature of 125° C. or less is particularly desirable for a low-temperature powder coating for heat sensitive substrates.

A powder coating technology based on the use of $C_{12}$ to $C_{23}$ diacids was developed as described in PCT Application Serial Number PCT/US2019/015234, entitled Powder Coating Resins from C12-C23 Diacids, (U.S. application Ser.

No. 16/965,003, filed on even date herewith, which is incorporated herein by reference in its entirety.

The present powder coating technology was developed based on the use Cu to $C_{23}$ diesters. The $C_{12}$ to $C_{23}$ diesters are reacted with a first reactant comprising an amine alcohol, or a mixture of a polyamine and a polyol, or a mixture of an amine alcohol and a polyamine, or a mixture of an amine alcohol and a polyol, or combinations thereof to form an intermediate polyol. The intermediate polyol is the reacted with a first diacid to form a carboxylic acid terminated polymer.

As the molecular weight of the resin increases, the ratio of acid value to amine and alcohol groups decreases. The molecular weight, acid value, and functionality were controlled through selective stoichiometry of acid groups with amines and alcohols, resulting in a resin with reactive carboxylic acid functionality. The molecular weight of the resin is typically more than 475 g/mol and less than 10,000 g/mol, or more than 475 g/mol and less than 7,500 g/mol, or more than 475 g/mol and less than 5,000 g/mol.

Diesters such as $C_{18}$ diesters have been produced by the olefin metathesis of fatty acid methyl esters.

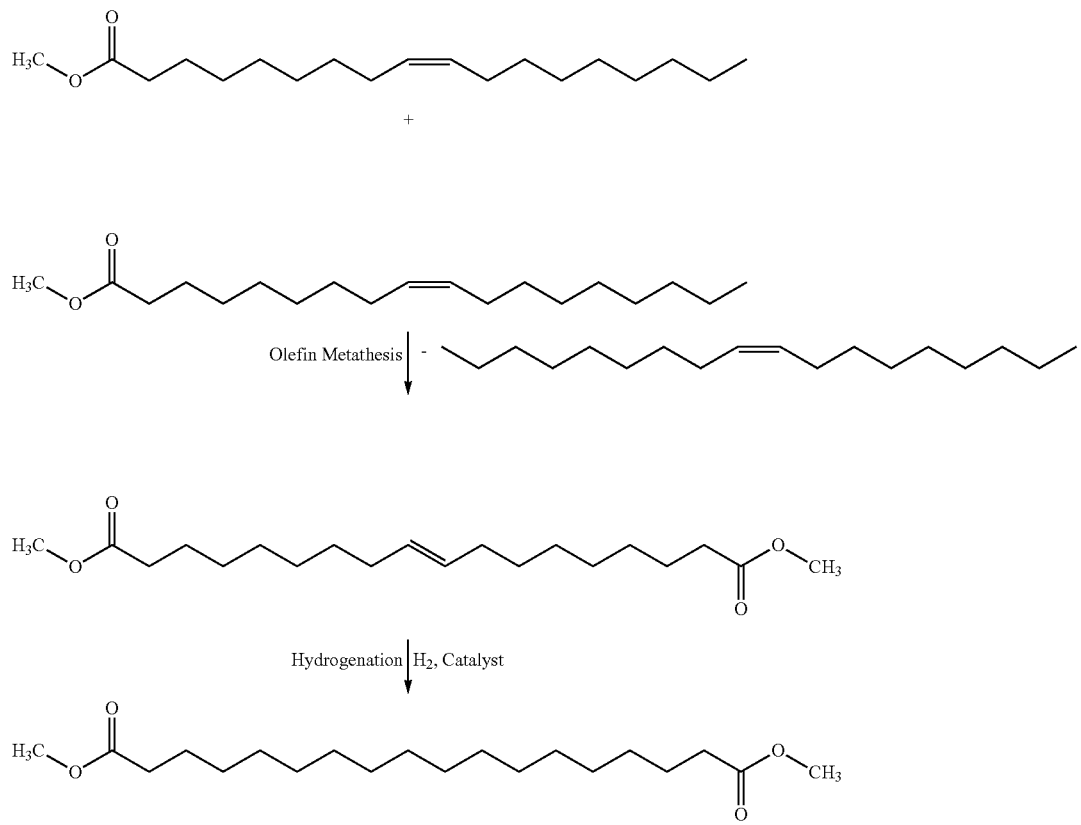

The production process for $C_{19}$ diester from high oleic soybean oil is illustrated below.

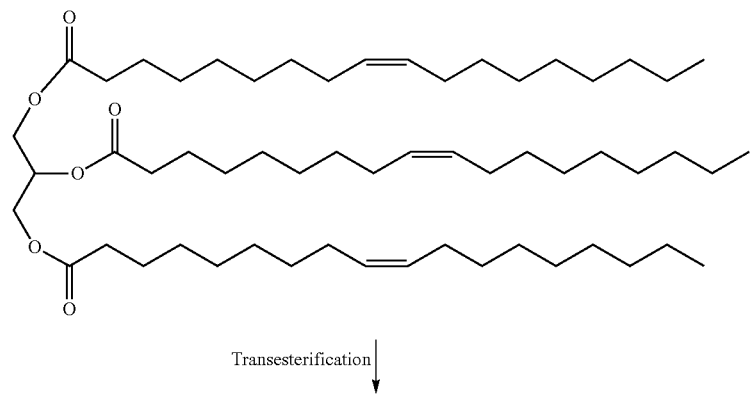

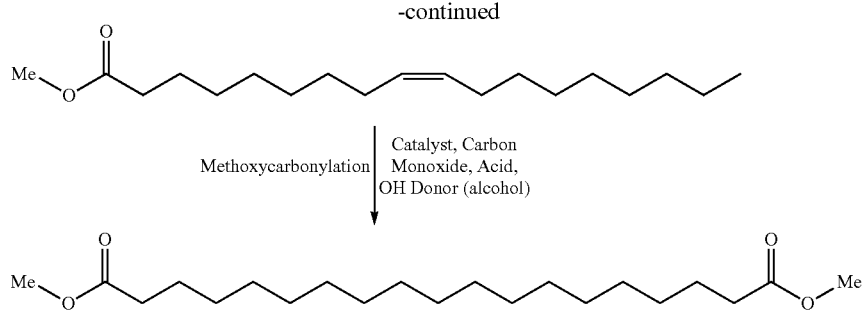

By utilizing the dimethyl ester, a production and purification step of the primary resin component was removed. Typically, for example, a $C_{18}$ diacid is produced by hydrolysis of the ester, acidification, and purification. Use of the diester as the starting material, eliminates the need for these steps and may lower the overall cost of the primary feedstock and increase its availability.

There are limitations with respect to how the synthesis progresses in a timely manner. Because the resin contains both amide and ester linkages, use of dimethyl esters requires transesterification to take place. Furthermore, a polyol intermediate is produced which is then esterified with a diacid to achieve a carboxylic acid terminated resin. Because amidification reacts quickly, it would be desirable to produce amide polyols from the dimethyl esters. These polyols would then be esterified through typical condensation reaction.

The reaction of a $C_{19}$ diester with ethanolamine to form an intermediate polyol followed by reaction of the intermediate polyol with azelaic acid is shown below.

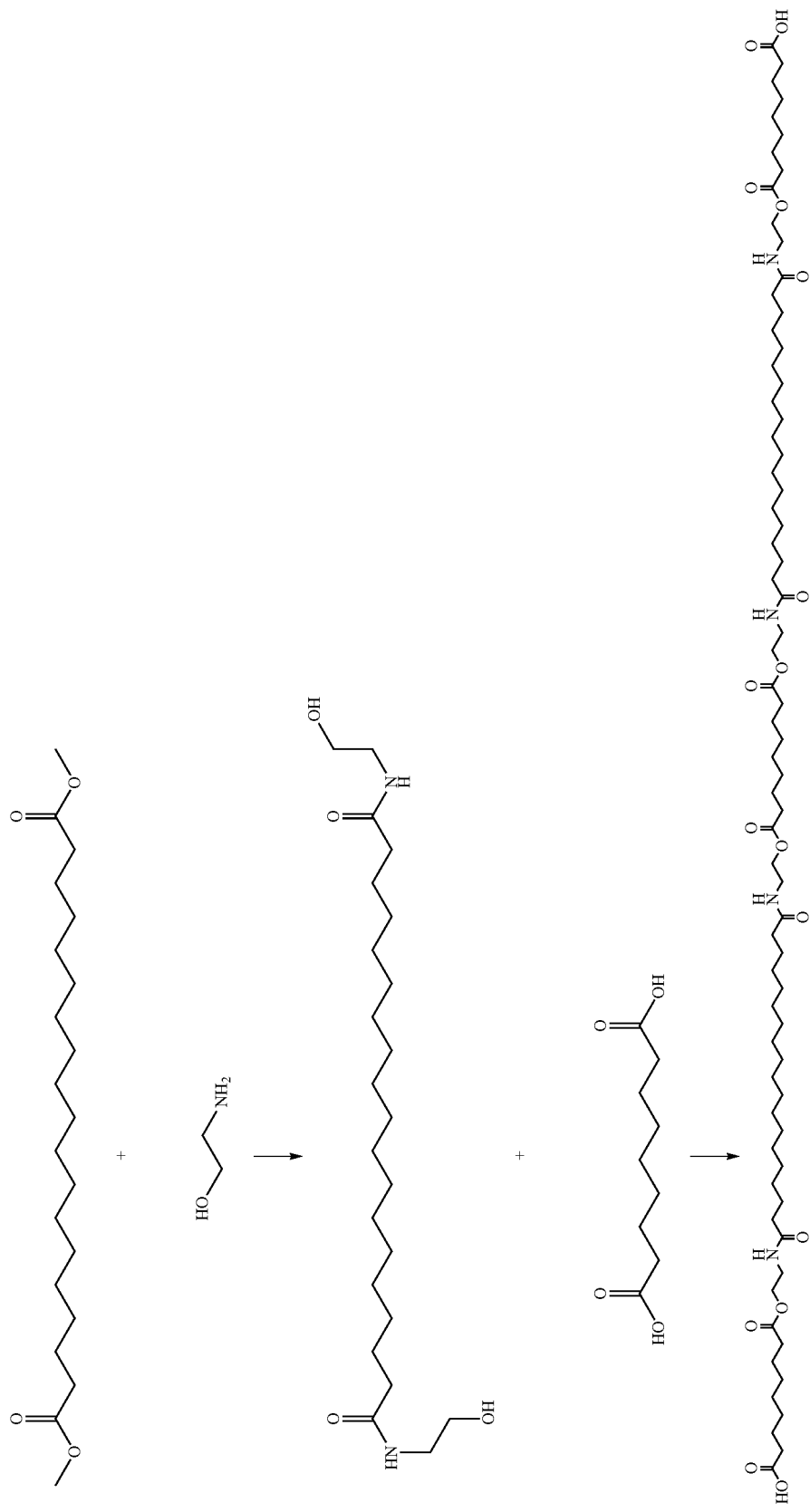

Other amides and mixed amides can be produced through the use of other amines such as diethanolamine.

The resin technology of the present invention is based on the use of $C_{12}$ to $C_{23}$ diesters in powder coating resins and powder coatings made using the powder coating resins. The diesters comprise $C_{12}$ to $C_{23}$ diesters, or $C_{16}$ to $C_{23}$ diesters, or $C_{18}$ to $C_{23}$ diesters. Mixtures of diesters can be used. Mixtures of diesters include mixtures of two or more $C_{12}$ to $C_{23}$ diesters. Some mixtures include one or more $C_{18}$ to $C_{23}$ diesters with one or more $C_{12}$ to $C_{16}$ diesters. In addition, one or more $C_{12}$ to $C_{23}$ diesters can be mixed with one or more $C_2$ to $C_{11}$ diesters.

The $C_{12}$ to $C_{23}$ diesters can be produced from the esterification of the diacid with various alcohols such as methanol or ethanol. Biobased $C_{12}$ to $C_{23}$ diesters can be prepared via the olefin metathesis of fatty esters, and methoxycarbonylation of fatty esters. Fatty esters are the typically the reaction product of mono-alcohol such as methanol or ethanol with the triglyceride oil or fatty acids derived from animal fats, algal oils and plant or vegetable oils, including, but not limited to, soybean oil, canola oil, rapeseed oil, sunflower oil, palm oil, cottonseed oil, corn oil, safflower oil, and tall oil, and including high oleic variations.

The $C_{12}$ to $C_{23}$ diesters are reacted with a reactant having an alcohol functionality and an amine functionality. The reactants can have primary or secondary amine functionality, and/or primary or secondary alcohol functionality. They can be mono- or polyfunctional amine and/or mono- or polyfunctional alcohols.

The reactant can be an amine alcohol, or a mixture of a polyamine and a polyol, or a mixture of an amine alcohol and a polyamine, or a mixture of an amine alcohol and a polyol, or combinations thereof.

Suitable amine alcohols include, but are not limited to, amine monoalcohols and amine polyols. Examples include, but are not limited to, ethanolamine, N-methyl ethanolamine, 1-amino-2-propanol, 2-amino-1-propanol, 3-amino-1-propanol, 3-amino-1-butanol, 4-amino-2-butanol, 3-amino-2-methyl-1-propanol, 3-amino-2-methyl-1-butanol, 4-amino-3-methyl-2-butanol, 2-(aminomethyl)-1-butanol, 3-amino-2,2-dimethyl-1-propanol, 4-amino-2-pentanol, 1-amino-3-pentanol, 3-amino-1-pentanol, 4-amino-2-methyl-2-pentanol, 3-amino-3-methyl-1-butanol, 3-amino -2-(aminomethyl)-1-propanol, diethanolamine, 3-amino-1,2-propanediol, 2-(aminomethyl)-1,3-propanediol, 3-amino-1,5-pentanediol, 2-amino-1,4-butanediol, or combinations thereof. Amine alcohols also include N-alkyl-substituted amine alcohols with alkyl groups having 1-10 carbon atoms.

Suitable polyamines include, but are not limited to, ethylene diamine, propylene diamine, butane diamine, pentane diamine, hexamethylene diamine, piperazine or combinations thereof.

Suitable polyols include, but are not limited to, ethylene glycol, propylene glycol, 1,3-propandiol, 1,4-butanediol, 1,5-pentanediol, or combinations thereof.

An intermediate polyol is formed by the reaction of the $C_{12}$ to $C_{23}$ diester and a first reactant comprising an amine alcohol, or a mixture of a polyamine and a polyol, or a mixture of an amine alcohol and a polyamine, or a mixture of an amine alcohol and a polyol, or combinations thereof. The intermediate polyol is reacted with a first diacid. Any suitable diacid can be used. The first diacid may include, but is not limited to, a short-chain diacid such as oxalic acid, malonic acid, succinic acid, glutaric acid, adipic acid, pimelic acid, suberic acid, azelaic acid, sebacic acid, decanoic acid and undecanedioic acid, brassylic acid or combinations thereof.

The ratio of the amine functionality to the alcohol functionality can be adjusted to increase or decrease the physical properties (e.g., melting point temperature) of the resin. For example, increasing the number of amide groups often raises the melting point temperature and reduces solubility in common solvents. Increasing the ester groups can reduce the melting point temperature.

The resin mixtures can also include carboxylic acid terminated polymers having ester and amide functionality which are the reaction product of a $C_{12}$ to $C_{23}$ diacid with a third reactant comprising an amine alcohol, or a mixture of a polyamine and a polyol, or a mixture of an amine alcohol and a polyamine, or a mixture of an amine alcohol and a polyol, or combinations thereof. Additionally, the mixtures can include an acetoacetate terminated polyol comprising the reaction product of a third intermediate polymer with acetoacetate, where the third intermediate polyol comprises the reaction product of a second $C_{12}$ to $C_{23}$ diacid with a fourth reactant comprising an amine alcohol, or a mixture of a polyamine and a polyol, or a mixture of an amine alcohol and a polyamine, or a mixture of an amine alcohol and a polyol, or combinations thereof. The total amount of the carboxylic acid terminated polymer from the $C_{12}$ to $C_{23}$ diacid and the acetoacetate terminated polyol is less than 50 wt % of the resin.

The resins produced may have an acid value in the range of 20-90 mg KOH/g, or 30-70 mg KOH/g, or 40-50 mg KOH/g, or 43-47 mgKOH/g. The acid value is achieved by the excess amount of diacid relative to the amount of amine alcohols, polyamines, and polyols used. Diacid is used in excess to ensure that there are carboxylic acids groups available for reaction with the cross-linking agent in the formulated powder coating.

The resins may have a peak melting point of 90-130° C., or 118-123° C.

The resins may have a viscosity of less than 4000 centipoise at 125° C., or less than 3000 centipoise, or less than 2000 centipoise, or less than 1000 centipoise, or 700 to 900 centipoise.

The resins can be produced without an added catalyst, if desired. This is advantageous because typical polyester resins require a catalyst, and some catalysts have health concerns.

The resins can be formulated into a powder coating. The formulation includes a cross-linker which can react with the carboxylic acid end groups. Suitable cross-linkers include, but are not limited to, epoxy cross-linker compounds and resins, hydroxyalkylamide (HAA) cross-linkers, or combinations thereof, and the like. Epoxy type cross-linkers include, but are not limited to, triglycidyl isocyanurate (TGIC), glycidylesters, glycidylmethacrylate resins, aliphatic oxiranes, or combinations thereof, and the like The powder coating formulation can include other components typically included in powder coating compositions as are known in the art. These additional components can include, but are not limited to, one or more of the following: catalysts, flow agents, promoters, degassers, pigments, pigment dispersing aids, fillers, UV absorbers, light stabilizers, antioxidants, antistatic/charge control additives, tribo-charging additives, anti-caking additives, mar resistance additives, slip agents, texturizing additives, matting agents, and the like.

The powder coating may be applied electrostatically to a substrate and thermally cured. The cure time may be typically less than 30 min, or less than 20 min, or less than 10 min, or less than 5 min, or less than 3 min.

The powder coating may be cured at temperatures in the range of 120-220° C. Typical coatings may cure at temperatures in the range of 180-220° C., while others may cure at temperatures in the range of 150-170° C., and others may cure in the range of 125-140° C.

The powder coating may have good appearance aesthetics and useful properties including gloss (e.g., greater than 60 gu at 60°), adhesion (e.g., 5B), flexibility (e.g., 160 in-lb forward and reverse impact), and solvent resistance (e.g., 100 double rub with MEK). The power coatings may have excellent durability with QUV-B accelerated weathering tests.

The specific $C_{12}$ to $C_{23}$ diesters, amine alcohols, polyamines, and/or polyols, and the amounts used to produce the powder coating resin can be selected to obtain the properties needed for a particular application. Some applications have higher requirements for physical properties than other applications. Thus, while a powder coating resin might not be acceptable for one application with high physical property requirements, it could be acceptable for other applications which do not require the same level of physical properties.

Longer $C_{18}$ to $C_{23}$ diesters chain length generally lead to better properties than shorter $C_{12}$ to $C_{16}$ diesters.

EXAMPLE 1

Resin from Nonadecanedioic Acid Dimethyl Ester 150.01 g of nonadecanedioic acid dimethyl ester was weighed into a flask containing a stirbar, 0.23 g of dibutyltin oxide, 30.93 g ethanolamine, and 3.33 g of diethanolamine. A short path distillation apparatus, heating mantle, and thermocouple were attached. The mixture was heated to 130° C. for 40 minutes. The temperature was next raised to 140° C. for 30 minutes, 145° C. for 45 minutes, 155° C. for 1.5 hours, 160° C. for 1 hour, 165° C. for 1 hour, 175° C. for 7 hours, 180° C. for 2.75 hours, and 200° C. for 17 hours. 39.64 g of azelaic acid was then added to the mixture and heated to 200° C. for 4 hours followed by 220° C. for 2 hours with slight argon headspace flow. The product was poured into a crystallization dish. The solid product was broken and transferred to a jar.

For the reaction in Example 1, $C_{19}$ dimethyl ester was used for 67% mol of the diester/diacid component and azelaic acid for 33% mol diester/diacid component. For the ratios of ethanolamine and diethanolamine, transesterification was required. This led to longer reaction time when compared to carboxylic acid amidification/esterification. A small amount of dibutyltin oxide was added as transesterification catalyst. A solid resin with a lower melt profile was generated. The acid value target was 45 but the actual AV was 82.7. This means more time was likely needed for the final esterification.

By "about" we mean within 10%, or within 5%, or within 1% of the value listed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A powder coating resin comprising:
a dicarboxylic acid terminated polymer having carboxylic acid groups on both ends and having ester and amide functionality comprising the reaction product of an intermediate polyol and a diacid, and wherein the intermediate polyol is the reaction product of a C18 diester and an amine alcohol;
wherein the molecular weight of the resin is in the range of 475 g/mol to 10,000 g/mol, and wherein the dicarboxylic acid terminated polymer has an acid value in the range of 20-90 mg KOH/g, a peak melting point of 90-130° C., and a melt viscosity of less than 4000 centipoise at 125° C.;
the resin being in the form of a free-flowing powder.

2. The resin of claim 1 wherein the amine alcohol comprising ethanolamine, N-methyl ethanolamine, 1-amino-2-propanol, 2-amino-1-propanol, 3-amino-1-propanol, 3-amino-1-butanol, 4-amino-2-butanol, 3-amino-2-methyl-1-propanol, 3-amino-2-methyl-1-butanol, 4-amino-3-methyl-2-butanol, 2-(aminomethyl)-1-butanol, 3-amino-2,2-dimethyl-1-propanol, 4-amino-2-pentanol, 1-amino-3-pentanol, 3-amino-1-pentanol, 4-amino-2-methyl-2-butanol, 3-amino-3-methyl-1-butanol, 3-amino-2-(aminomethyl)-1-propanol diethanolamine, 3-amino-1,2-propanediol, 2-(aminomethyl)-1,3-propanediol, 3-amino-1,5-pentanediol, 2-amino-1,4-butanediol, or combinations thereof.

3. The resin of claim 1 wherein the amine alcohol comprises ethanolamine, diethanolamine, or combinations thereof.

4. The resin of claim 1 wherein the diacid comprises oxalic acid, malonic acid, succinic acid, glutaric acid, adipic acid, pimelic acid, suberic acid, azelaic acid, sebacic acid, undecanedioic acid, brassylic acid, or combinations thereof.

5. The resin of claim 1 wherein the molecular weight of the resin in the range of 475 g/mol to 5,000 g/mol, and wherein the carboxylic acid terminated polymer has the acid value in the range of 30-70 mg KOH/g; the peak melting point of 90-130° C.;
and the melt viscosity of less than 2000 mPa's (2000 centipoise) at 125° C.

6. The resin of claim 1 wherein the molecular weight of the resin in the range of 475 g/mol to 5,000 g/mol, and wherein the first carboxylic acid terminated polymer has the acid value in the range of 40-50 mg KOH/g; the peak melting point of 90-130° C.; and the melt viscosity of less than 1000 mPa's (1000 centipoise) at 125° C.

* * * * *